United States Patent
Phelippeau et al.

(10) Patent No.: US 8,199,215 B2
(45) Date of Patent: Jun. 12, 2012

(54) IMAGE FILTERING

(75) Inventors: Harold Phelippeau, Villebon sur Yvette (FR); Stefan Bara, Epron (FR); Hugues G. F. Talbot, Champs sur Marne (FR); Mohamed Akil, Noisiel (FR)

(73) Assignee: NXP B.V., Eindhoven (NL)

( * ) Notice: Subject to any disclaimer, the term of this patent is extended or adjusted under 35 U.S.C. 154(b) by 247 days.

(21) Appl. No.: 12/809,417

(22) PCT Filed: Dec. 15, 2008

(86) PCT No.: PCT/IB2008/055308
§ 371 (c)(1), (2), (4) Date: Jun. 18, 2010

(87) PCT Pub. No.: WO2009/083858
PCT Pub. Date: Jul. 9, 2009

(65) Prior Publication Data
US 2010/0271502 A1 Oct. 28, 2010

(30) Foreign Application Priority Data
Dec. 20, 2007 (EP) .................................. 07123839

(51) Int. Cl.
H04N 5/228 (2006.01)
H04N 9/64 (2006.01)
H04N 5/235 (2006.01)
G06K 9/40 (2006.01)
G06K 9/38 (2006.01)

(52) U.S. Cl. .................. 348/222.1; 348/246; 348/229.1; 382/254; 382/260; 382/261; 382/271; 382/274; 382/275

(58) Field of Classification Search ............... 348/222.1, 348/234–247; 382/162–180, 254–308
See application file for complete search history.

(56) References Cited

U.S. PATENT DOCUMENTS 5,091,963 A * 2/1992 Litt et al. ....................... 382/149
6,661,918 B1 * 12/2003 Gordon et al. ................ 382/173
(Continued)

FOREIGN PATENT DOCUMENTS
EP 1109130 A2 6/2001
(Continued)

OTHER PUBLICATIONS

Nagao, Makoto, et al; "Edge Preserving Smoothing"; Computer Graphics and Image Processing 9; pp. 394-407; (1979).
(Continued)

*Primary Examiner* — Aung S Moe
*Assistant Examiner* — Chia-Wei A Chen

(57) ABSTRACT

Pixels of an image (200) are coded as color vectors specified by RGB values. The image (200) is filtered by calculating new color vectors for the pixels on a pixel by pixel basis. A new color vector for a subject pixel (201) is calculated from the average of neighbor pixels (203) in a window (202) around the subject pixel (201). A first threshold is calculated from the standard deviation of the color vectors of the neighbor pixels (203) in the window (202). A second threshold is calculated from the median maximum difference between the values defining the color vectors of the respective neighbor pixels (203) in the window (202) and the standard deviation of the values. Only neighbor pixels (203) having a color vector that differs from the color vector of the subject pixel (201) by less than or the same as the first and second thresholds are used in calculation of the new color vector for the subject pixel (201).

14 Claims, 3 Drawing Sheets

U.S. PATENT DOCUMENTS

| | | | | |
|---|---|---|---|---|
| 7,676,111 | B2* | 3/2010 | Yamauchi | 382/275 |
| 2002/0154339 | A1 | 10/2002 | Kuo et al. | |
| 2002/0164074 | A1* | 11/2002 | Matsugu et al. | 382/173 |
| 2003/0228045 | A1* | 12/2003 | Asai et al. | 382/141 |
| 2006/0192693 | A1* | 8/2006 | Yamauchi | 341/50 |
| 2006/0226337 | A1 | 10/2006 | Lim et al. | |
| 2008/0085060 | A1* | 4/2008 | Bosco et al. | 382/264 |
| 2008/0095435 | A1* | 4/2008 | Lipton et al. | 382/173 |
| 2009/0297023 | A1* | 12/2009 | Lipton et al. | 382/164 |
| 2010/0085539 | A1* | 4/2010 | Harada et al. | 351/206 |
| 2010/0091194 | A1* | 4/2010 | Lei et al. | 348/607 |
| 2010/0201800 | A1* | 8/2010 | Yamamoto et al. | 348/79 |
| 2011/0262045 | A1* | 10/2011 | Ichikawa | 382/218 |

FOREIGN PATENT DOCUMENTS

| | | |
|---|---|---|
| EP | 1420363 A2 | 5/2004 |
| WO | 02102086 A2 | 12/2002 |

OTHER PUBLICATIONS

Lee, Jong-Sen; "Digital Image Smoothing and the Sigma Filter"; Computer Vision, Graphics and Image Processing 24; pp. 255-269 (1983).

Jung, S. H., et al; "Adaptive Image Restoration of Sigma Filter Using Local Statistics and Human Visual Characteristics"; Electronic Letters, vol. 24, No. 4; 2 pages (Feb. 18, 1988).

Gallagher, Jr., Neal C.; "Median Filters: A Tutorial"; ISAS '88; IEEE Explore; 8 pages; (1988).

Ma, Zhonghua, et al; "A histogram based adaptive vector filter for color image restoration"; Information, Communications and Signal Processing, 2003 and 4th PAC IFIC Rim Conference on Multimedia; Piscataway, NJ, USA; IEEE, vol. 1; (Dec. 15, 2003).

Costantini, Roberto, et al; "Virtual Sensor Design"; Audiovisual Communication Laboratory, EPFL, Lausanne, Switzerland; 12 pages (2004).

Buades, Antoni, et al; "On image denoising methods"; retrieved from http://www.cmla.ens-cachan.fr/Documentation/Prepublications/2004/ Jun. 16, 2010; 40 pages (2004).

Buades, Antoni, et al; "A Review of Image Denoising Algorithms, with a new one"; Multiscale Model. Simul. vol. 4, No. 2, pp. 490-530; Society of Industrial and Applied Mathematics (2005).

Ma, Zhonghua, et al; "A neighborhood evaluated adaptive vector filter for suppression of impulse noise in color images"; Real-Time Imaging; Academic Press Limited, GB; vol. 11, No. 5-6; pp. 403-416; (Oct. 1, 2005).

Lukac, Rasislav, et al; "Vector sigma filters for noise detection and removal in color images"; Journal of Visual Communication and Image Representation, Academic Press, vol. 17, No. 1; pp. 1-16; (Feb. 1, 2006).

Smolka, Bogdan, et al; "Generalized Vector Median Filter"; Image and Signal Processing and Analysis, 2007; pp. 254-257; (Sep. 1, 2007).

Perona, Pietro, et al; "Scale-Space and Edge Detection Using Anisotropic Diffusion"; IEEE Transactions on Pattern Analysis and Machine Intelligence, vol. 12, No. 7: pp. 629-639; (Jul. 1990).

Alvarez, Luis, et al; "Image Selective Smoothing and Edge Detection by Nonlinear Diffusion. II"; Society for Industrial and Applied Mathematics, vol. 29, No. 3; pp. 845-866 (Jun. 1992).

Deriche, Rachid, et al; "Les EDP en Traitement des Images et Vision par Ordinateur"; Institut National de Recherche en Informatique et en Automatique (INRIA), No. 2697 63 pages (Nov. 1995) No English publication available.

Lukac, R., et al; "Generalized Adaptive Vector Sigma Filters"; ICME 2003; IEEE; 4 pages; (2003).

International Search Report and Written Opinion for Application PCT/IB2008/055308 (Dec. 15, 2008).

\* cited by examiner

IMAGE FILTERING

FIELD OF THE INVENTION

The invention relates to a method and apparatus for filtering an image, in particular to reduce noise.

BACKGROUND TO THE INVENTION

When an image is captured electronically, it tends to be affected by noise. In particular, most image sensors introduce photon shot noise and dark current noise into images that they capture. Noise can also be introduced by operations in the image formation processing chain (for example demosaicing).

Filtering is commonly used to remove noise from images. This invention concerns vectorial image neighbour filtering. A local neighbour filter calculates the output value of a subject pixel using statistics concerning neighbour pixels found in a window around the subject pixel. The subject pixel is typically at the centre of the window. As the subject pixel changes to allow filtering of the whole image, the window is moved and new neighbour pixels are identified. The window is therefore often referred to as a sliding window.

The pixels of the image may each be represented by a colour vector. The colour vector is made up of a value in each one of several different dimensions or channels. For an image coded using an RGB standard, the colour vector has three dimensions or channels; red, green and blue. The value in each channel can take one of a given number of levels. Coding images with 255 levels in each channel is common.

One particular local neighbour vector filter, referred to as a vector sigma filter, is described in the paper "Vector Sigma Filters For Noise Detection And Removal In Colour Images", Lukac et al, J. Vis. Commun. Image R. 17 (2006) 1-26. The principle of this filter is to replace the colour vector of the subject pixel by the average of the colour vectors of only the neighbour pixels that respect a fixed criterion. More specifically, the new colour vector $\vec{g}(i,j)$ of the subject pixel at coordinates i,j in the filtered image is defined by $$\vec{g}(i,j) = \frac{\sum_{s=(i-m)}^{m+i} \sum_{t=(j-m)}^{m+j} \delta_{s,t} \vec{f}(s,t)}{\sum_{s=(i-m)}^{m+i} \sum_{t=(j-m)}^{m+j} \delta_{s,t}} \quad (1)$$

where $\vec{f}(s,t)$ is the colour vector of a neighbour pixel at coordinates s,t, the sliding window has dimensions (2m+1)×(2m+1) and $\delta_{s,t}$ is a Dirac function defined by $$\delta_{s,t} = \begin{cases} 1 & \text{if } |\vec{f}(s,t) - \vec{f}(i,j)| \le (k \times \Delta) \\ 0 & \text{otherwise} \end{cases} \quad (2)$$

where $|\vec{f}(s,t) - \vec{f}(i,j)|$ is the difference between the colour vector $\vec{f}(s,t)$ of a neighbour pixel and the colour vector $\vec{f}(i,j)$ of the subject pixel, and (k×Δ) is a threshold value in which k is a variable and Δ is the standard deviation of the colour vectors of the neighbour pixels, which can be defined by $$\Delta = \sqrt{\frac{1}{(2m+1)^2} \sum_{i=1}^{(2m+1)^2} \left( \|\vec{f}_i - \vec{\mu}\|_2 \right)^2} \quad (3)$$

where $f_i$ is the colour vector of the ith neighbour pixel in the window and $\vec{\mu}$ is the mean colour vector of all the neighbour pixels in the window.

It can be appreciated from equation (2) that the new colour vector $\vec{g}(i,j)$ yielded from equation (1) is based on only neighbour pixels in the window having a colour vector $\vec{f}(s,t)$ that differs from the colour vector $\vec{f}(i,j)$ of the subject pixel by an amount less than or equal to the threshold (k×Δ). So, neighbour pixels that have a colour vector $\vec{f}(s,t)$ that differs too much from the colour vector $\vec{f}(i,j)$ of the subject pixel are discarded and not used in the calculation of the new colour vector $\vec{g}(i,j)$.

This filter reduces noise in images. However, it suffers from a known drawback that impulsive noise represented by clusters of one or two pixels is not always eliminated. To overcome this drawback, it has been suggested to calculate an improved new colour vector $\hat{\vec{g}}(i,j)$ for the subject pixel as the average of the colour vectors $\vec{f}(i,j)$ of just the pixels immediately adjacent to the subject pixel when the number n of neighbour pixels selected in equation (2) above is less than a given number N. This improved new colour vector $\hat{\vec{g}}(i,j)$ can be defined by $$\hat{\vec{g}}(i,j) = \begin{cases} \vec{g}(i,j) & \text{if } n > N \\ \text{immediate neighbours' average} & \text{if } n \le N \end{cases} \quad (4)$$

A common value of N is 5, as recommended in the paper "Digital Image Smoothing And The Sigma Filter", Computer graphics and Image Processing, 24, 225-269, 1983. However, optimum image filtering is still not achieved using this modified version of the vector sigma filter. In particular, this filter still does not completely remove noise from an image. It also has a tendency to blur edges and thin details.

The present invention seeks to overcome these problems.

SUMMARY OF THE INVENTION

According to a first aspect of the invention there is provided a method of filtering an image, the image having pixels and the colour of each pixel being specified by values that define a colour vector for the pixel, the method comprising:

identifying neighbour pixels in a window around a subject pixel;

determining, for each of the neighbour pixels in the window, a maximum difference between the values defining the colour vector for that neighbour pixel;

calculating a threshold based on the maximum differences and the standard deviation of the values defining the colour vectors for the neighbour pixels in the window;

selecting only those neighbour pixels in the window that have a colour vector that differs from the colour vector of the subject pixel by less than or the same as the threshold; and determining a new colour vector for the subject pixel based on the colour vectors for the selected neighbour pixels.

Also, according to a second aspect of the present invention, there is provided an apparatus for filtering an image, the image having pixels and the colour of each pixel being specified by values that define a colour vector for the pixel, the apparatus comprising a processor for:

identifying neighbour pixels in a window around a subject pixel;

determining, for each of the neighbour pixels in the window, a maximum difference between the values defining the colour vector for that neighbour pixel;

calculating a threshold based on the maximum differences and the standard deviation of the values defining the colour vectors for the neighbour pixels in the window;

selecting only those neighbour pixels in the window that have a colour vector that differs from the colour vector of the subject pixel by less than or the same as the threshold; and determining a new colour vector for the subject pixel based on the colour vectors for the selected neighbour pixels.

So, the invention considers the values that make up the colour vector of a neighbour pixel. The maximum difference between these values for the neighbour pixel contains information about the colour of pixel. Likewise, the standard deviation of these values for the neighbour pixels in the window contains information about the colour of the neighbour pixels in the window. So, by basing a threshold for selection of neighbour pixels in the window on the maximum differences and the standard deviation of the values, the selection can be based on this colour information. It has been found that filtering based on neighbour pixels selected in this way improves the preservation of edges and thin details in the filtered image, whilst further reducing noise.

It should be noted that the neighbour pixels may not necessarily be limited to only those pixels which are immediately adjacent to the subject pixel. Rather, the neighbour pixels are usually all of the pixels inside the window except the subject pixel. So, the neighbour pixels may be adjacent to the subject pixel and/or near to the subject pixel, with the extent of the neighbour pixels being defined by the window.

It is preferred that the threshold is determined based on a median of the maximum differences for the neighbour pixels in the window. Likewise, it is preferred that the threshold is a scaled product of the maximum differences and the standard deviation of the values defining the colour vectors for the neighbour pixels in the window.

In a preferred example, determining the new colour vector may be based on the average of the colour vectors for the selected neighbour pixels. The method may also comprise: calculating another threshold based on the standard deviation of the colour vectors of the neighbour pixels in the window; and selecting only those neighbour pixels in the window that have a colour vector that differs from the colour vector of the subject pixel by less than or the same as the another threshold. Similarly, the processor may also calculate another threshold based on the standard deviation of the colour vectors of the neighbour pixels in the window; and select only those neighbour pixels in the window that have a colour vector that differs from the colour vector of the subject pixel by less than or the same as the another threshold. It will be appreciated that this is similar to the vector sigma filter of the prior art. Indeed, in this example, the invention is an improvement of that filter and can be referred to as a hue vector sigma filter.

The colour vector of each pixel of the image is preferably defined by RGB values. In other words, RGB coding may be used. However, this is not essential. The invention is equally applicable to other types of coding for colour images.

In a preferred example, the invention is implemented in a digital camera, such as a digital still camera or a digital video camera. However, it might equally be implemented in a mobile telephone, personal digital assistant (PDA), smart phone or such like. Indeed, it might be implemented in any form of image processing apparatus.

Use of the term "processor" above is intended to be general rather than specific. The invention may be implemented using an individual processor, such as a digital signal processor (DSP) or central processing unit (CPU). However, the invention could equally be implemented using a hard-wired circuit or circuits, such as an application-specific integrated circuit (ASIC), or by embedded software, and it is intended that the term "processor" includes these options.

It can also be appreciated that the invention can be implemented using computer program code. Indeed, according to a further aspect of the present invention, there is therefore provided computer software or computer program code adapted to carry out the method described above when processed by a processing means. The computer software or computer program code can be carried by a computer readable medium. The medium may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

BRIEF DESCRIPTION OF DRAWINGS

The invention will now be described, by way of example only, with reference to the accompanying drawings, in which.

DETAILED DESCRIPTION OF PREFERRED EMBODIMENTS

Figure 1:
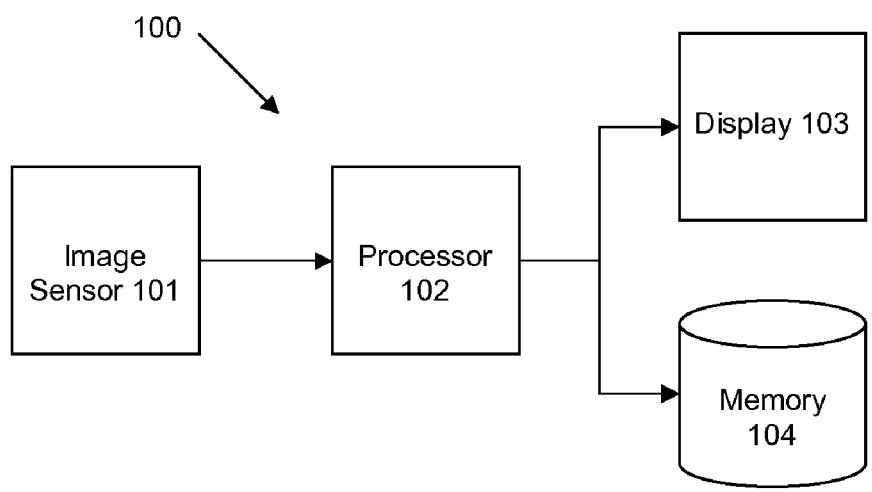
FIG. 1 is a schematic illustration of a digital camera.

Referring to FIG. 1, a digital camera 100 has an image sensor 101, a processor 102, a display 103 and a memory 104. The image sensor 101 captures an image 200, shown schematically in FIG. 2, and outputs it to the processor 102. The processor 102 filters the captured image 200 and outputs the filtered image to either or both of the display 103 and/or the memory 104. The display 103 displays the filtered image. The memory 104 stores it.

Figure 3:
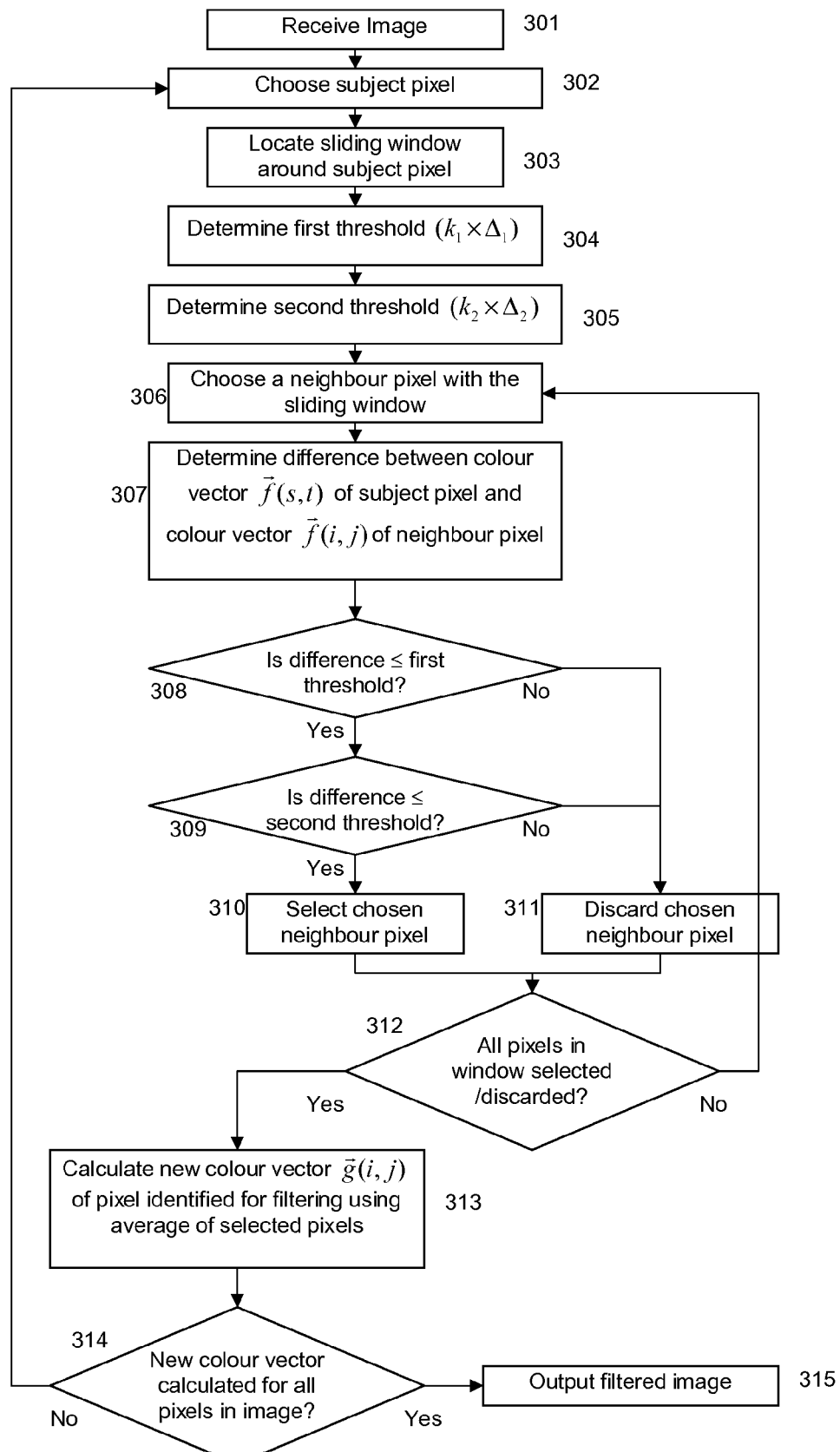
FIG. 3 is a flowchart showing a method by which the digital camera filters the image.

The processor 102 filters the captured image 200 using the process 300 shown in FIG. 3. In more detail, at step 301, the processor 102 receives the captured image 200 from the image sensor 101. The processor 102 filters the captured image 200 on a pixel by pixel basis. So, at step 302, the processor chooses a subject pixel 201 to be filtered and determines the colour vector $\vec{f}(s,t)$ of that pixel 201, where s,t are the coordinates of the subject pixel 201 in the captured image 200. In this embodiment, the image is coded using RGB encoding with 256 levels. This means that the colour vectors of the pixels have three dimensions or channels; red, green and blue, and that each value of each colour vector is one of 256 different values. In other embodiments, different encoding or a different number of levels can be used.

Figure 2:
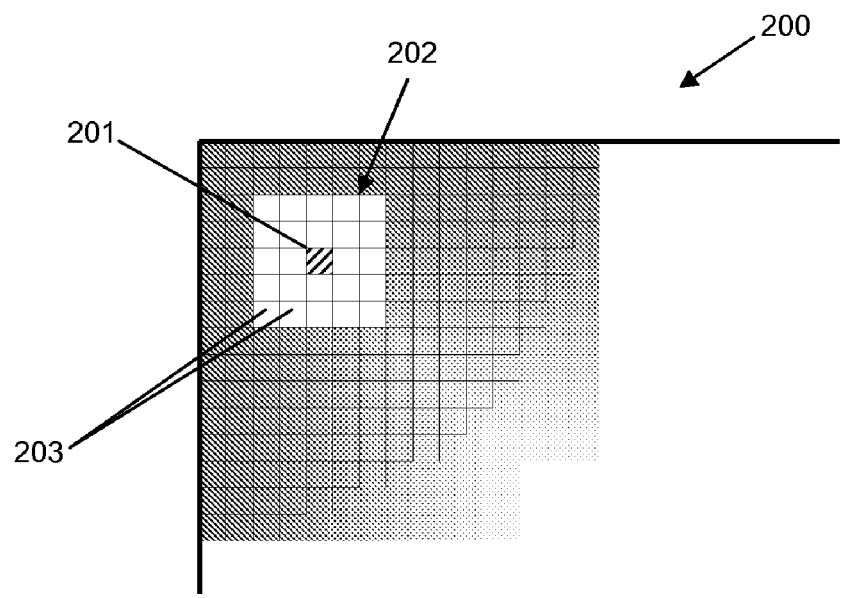
FIG. 2 is a schematic illustration of an image captured by the camera.

At step 303, the processor 102 locates a sliding window 202 around the subject pixel 201. The sliding window 202 identifies neighbour pixels 203 on the basis of which the subject pixel 201 can be later filtered. In this embodiment, as can be seen in FIG. 2, the subject pixel 201 is at the centre of the sliding window 202 and the sliding window 202 is square, with dimensions (2m+1) pixels by (2m+1) pixels. Typically, m has value 2, with the result that the sliding window 202 has dimensions 5 pixels by 5 pixels. In other embodiments, different size or shape sliding windows can be used.

At step 304, the processor 102 determines a first threshold ($k_1 \times \Delta_1$) on the basis of which the neighbour pixels 203 are later selected for use in filtering the subject pixel 201, where $k_1$ is a first variable equal to 1.8 and $\Delta_1$ is a first standard deviation defined by $$\Delta_1 = \sqrt{\frac{1}{(2m+1)^2} \sum_{i=1}^{(2m+1)^2} \left( \|\vec{f}_i - \vec{\mu}\|_2 \right)^2} \quad (5)$$

in which $\vec{f}_i$ is the colour vector of the ith neighbour pixel 203 in the sliding window 202 and $\vec{\mu}$ is the mean colour vector of all the neighbour pixels 203 in the window 202.

At step 305, the processor 102 determines a second threshold ($k_2 \times \Delta_2$), on the basis of which the neighbour pixels 203 are also later selected for use in filtering the subject pixel 201. $k_2$ is a second variable defined by $$k_2 = x \times \left(1 + y \times \frac{(D-d)}{D}\right) \quad (6)$$

where x is a third variable equal to 0.85, y is a fourth variable equal to 0.2, D is the number of levels to which each dimension of the colour vectors of the pixels of the captured image 200 is encoded (equal to 256 in this embodiment) and d is a fifth variable defined by $$d = \text{Median}\left(M(s,t) \middle| \begin{array}{l} s = (i-m) \to (i+m) \\ t = (j-m) \to (j+m) \end{array}\right) \quad (7)$$

where Median( ) is a median function and M(s,t) is defined by $$M(s,t) = \max\left(\text{abs}(v_p(s,t) - v_q(s,t)) \middle| \begin{array}{l} p = 1 \to n \\ q = 1 \to n \\ p \neq q \end{array}\right) \quad (8)$$

where abs( ) is an absolute value function, $v_p(s,t)$ and $v_q(s,t)$ are the pth and qth values of the colour vector of the neighbour pixel 203 at the coordinates s,t in the sliding window 202 and n is the number of dimensions of the colour vector (equal to 3 in this embodiment). So, the function M(s,t) finds the maximum difference between the values of the colour vector of a neighbour pixel 203. The fifth variable d is the median of these differences for all the neighbour pixels 203 in the sliding window 202. The function M(s,t) can be written $$M(s,t) = \max(\text{abs}(R(s,t)-G(s,t)); \text{abs}(R(s,t)-B(s,t)); \text{abs}(G(s,t)-B(s,t))) \quad (9)$$

for an RGB image, where R(s,t), G(s,t) and B(s,t) are respectively the red, green and blue values of the neighbour pixel 203.

$\Delta_2$ is a second standard deviation defined by $$\Delta_2 = \sqrt{\frac{1}{((2m+1)^2 \times n)} \sum_{i=1}^{(2m+1)^2 \times n} (x_i - \bar{x})^2} \quad (10)$$

where $x_i$ is the value in each dimension of the ith neighbour pixel 203 in the sliding window 202 and $\bar{x}$ is the mean value across all dimensions of all of the neighbour pixels 203 in the sliding window 202.

At step 306, the processor 102 chooses a neighbour pixel 203 in the sliding window 202. At step 307, the processor 102 determines the modulus of the difference between the colour vector $\vec{f}(s,t)$ of the subject pixel 201 and the colour vector $\vec{f}(i,j)$ of the chosen neighbour pixel 203, i.e. $|\vec{f}(s,t) - \vec{f}(i,j)|$. The processor 102 then compares the difference to the first threshold, at step 308. If the difference is less than or equal to the first threshold, the processor 102 compares the difference to the second threshold at step 309. If the difference is less than or equal to the second threshold, the chosen neighbour pixel 203 is selected for use in filtering the subject pixel 201 at step 310. If the difference is greater than either the first threshold or the second threshold, the chosen neighbour pixel 203 is discarded at step 311. This pixel selection can be defined by replacing equation (2) above with $$\delta_{s,t} = \begin{cases} 1 & \text{if } \left( \left| \vec{f}(s,t) - \vec{f}(i,j) \right| \leq (k_1 \times \Delta_1) \text{ and} \\ & \left( \left| \vec{f}(s,t) - \vec{f}(i,j) \right| \leq (k_2 \times \Delta_2) \right) \right) \\ 0 & \text{otherwise} \end{cases} \quad (11)$$

At step 312, the processor 102 determines when all of the neighbour pixels 203 in the sliding window 202 have either been selected or discarded. If any of the neighbour pixels still need to be selected or discarded, the processor returns to choose another neighbour pixel 203 at step 306, determine the difference between the colour vector for the subject pixel 201 and the colour vector of that chosen neighbour pixel 203 at step 307 and repeat the comparisons and selecting and discarding, as appropriate, at steps 308 to 311. When all the neighbour pixels in the sliding window 202 have either been selected or discarded, the processor 102 goes on to determine a new colour vector $\vec{g}(i,j)$ for the subject pixel 201 at step 313.

The processor 102 determines the new colour vector $\vec{g}(i,j)$ for the identified pixel 201 using the average of the selected neighbour pixels 203, according equation (1) above, i.e.

$$\vec{g}(i,j) = \frac{\sum_{s=(i-m)}^{m+i} \sum_{t=(j-m)}^{m+j} \delta_{s,t} \vec{f}(s,t)}{\sum_{s=(i-m)}^{m+i} \sum_{t=(j-m)}^{m+j} \delta_{s,t}} \quad (1)$$

The processor 102 then determines if new colour vectors have been determined for all the pixels in the captured image 200, at step 314. If not, the processor 102 returns to choose another subject pixel 201 at step 302 and repeats the steps 303 to 313 required to determine a new colour vector for that pixel 201. If new colour vectors have been determined for all the pixels in the captured image 200, the processor 102 outputs a filtered image using the new colour vectors at step 315.

Figure 4:
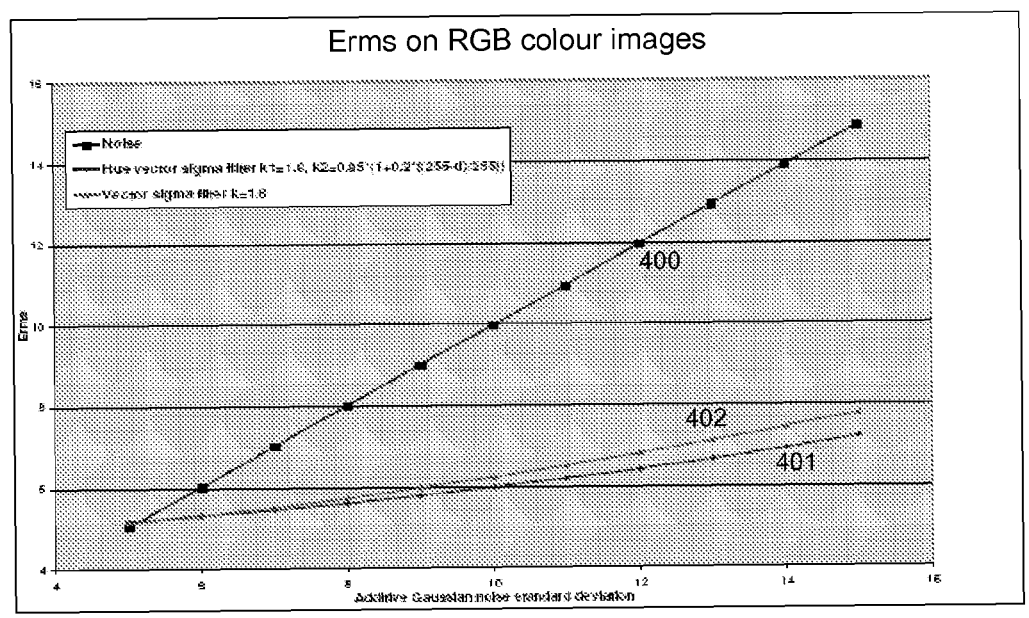
FIG. 4 is a graphical representation of root mean square error against additive Gaussian noise in a test image for a preferred embodiment of the invention and the prior art.

A common objective in image filtering is to minimise root mean square error $E_{RMS}$ of the filtered image. This has been tested for the preferred embodiment of the invention and the vector sigma filter of the prior art described above using an artificially noisy image, with $E_{RMS}$ defined by $$E_{rms} = \sqrt{\left[\frac{1}{MN} \sum_{i=0}^{M-1} \sum_{j=0}^{N-1} [\hat{g}(i,j) - f(i,j)]^2\right]} \quad (12)$$

where f(i,j) is the colour vector at coordinates i,j of an original image having dimensions M by N and $\hat{g}(i,j)$ is the colour vector at coordinates i,j of an artificially noisy version of the image after filtering. The results of this testing are shown in FIG. 4, where it can be seen that for increasing additive Gaussian noise 400 in the artificially noisy image, the $E_{RMS}$ 401 after filtering according to the preferred embodiment of the invention is lower than the $E_{RMS}$ 402 after filtering according to the vector sigma filter of the prior art. Furthermore, human visual comparison of the filtered images showed better edge preservation, as well as better noise removal, after filtering according to the preferred embodiment of the invention in comparison to after filtering according to the vector sigma filter of the prior art.

From reading the present disclosure, other variations and modifications will be apparent to the skilled person. Such variations and modifications may involve equivalent and other features which are already known in the art and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of filtering an image, the image having a plurality of pixels and a colour of each said pixel being specified by values that define a colour vector for said pixel, the method comprising:
   identifying neighbour pixels in a window around a subject said pixel;
   determining, for each of the neighbour pixels in the window, a maximum difference between the values defining the colour vector for that neighbour pixel;
   calculating a threshold based on the maximum differences and the standard deviation of the values defining the colour vectors for the neighbour pixels in the window;
   selecting only those neighbour pixels in the window that have a colour vector that differs from the colour vector of the subject pixel by less than or the same as the threshold; and
   determining a new colour vector for the subject pixel based on the colour vectors for the selected neighbour pixels.

2. The method of claim 1, wherein the threshold is determined based on a median of the maximum differences for the neighbour pixels in the window.

3. The method of claim 1, wherein the threshold is a scaled product of the maximum differences and a standard deviation of the values defining the colour vectors for the neighbour pixels in the window.

4. The method of claim 1, further comprising determining the new colour vector for the subject pixel based on an average of the colour vectors for the selected neighbour pixels.

5. The method of claim 1, further comprising:
   calculating another threshold based on the standard deviation of the colour vectors of the neighbour pixels in the window; and
   selecting only those neighbour pixels in the window that have a colour vector that differs from the colour vector of the subject pixel by less than or the same as the another threshold.

6. The method of claim 1, wherein the colour vector of each pixel of the image is defined by RGB values.

7. Computer software for implementing the method of claim 1 when processed by computer processing means.

8. An apparatus for filtering an image, the image having a plurality of pixels and the colour of each said pixel being specified by values that define a colour vector for the pixel, the apparatus comprising a processor for:
   identifying neighbour pixels in a window around a subject said pixel;
   determining, for each of the neighbour pixels in the window, a maximum difference between the values defining the colour vector for that neighbour pixel;
   calculating a threshold based on the maximum differences and the standard deviation of the values defining the colour vectors for the neighbour pixels in the window;
   selecting only those neighbour pixels in the window that have a colour vector that differs from the colour vector of the subject pixel by less than or the same as the threshold; and
   determining a new colour vector for the subject pixel based the colour vectors for the selected neighbour pixels.

9. The apparatus of claim 8, wherein the threshold is determined based on a median of the maximum differences for the neighbour pixels in the window.

10. The apparatus of claim 8, wherein the threshold is a scaled product of the maximum differences and the standard deviation of the values defining the colour vectors for the neighbour pixels in the window.

11. The apparatus of claim 8, wherein the processor determines the new colour vector for the subject pixel based on the average of the colour vectors for the selected neighbour pixels.

12. The apparatus of claim 8, wherein the processor:
   calculates another threshold based on the standard deviation of the colour vectors of the neighbour pixels in the window; and
   selecting only those neighbour pixels in the window that have a colour vector that differs from the colour vector of the subject pixel by less than or the same as the another threshold.

13. The apparatus of claim 8, wherein the colour vector of each pixel of the image is defined by RGB values.

14. A digital camera comprising the apparatus of claim 8.

* * * * *